United States Patent
Solomon et al.

(10) Patent No.: US 12,550,632 B2
(45) Date of Patent: Feb. 10, 2026

(54) RESISTIVE MEMORY WITH RESISTANCE SPREADING LAYER

(71) Applicant: INTERNATIONAL BUSINESS MACHINES CORPORATION, Armonk, NY (US)

(72) Inventors: Paul Michael Solomon, Westchester, NY (US); Takashi Ando, Eastchester, NY (US); John Rozen, Hastings on Hudson, NY (US); Eduard Albert Cartier, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 651 days.

(21) Appl. No.: 17/931,686

(22) Filed: Sep. 13, 2022

(65) Prior Publication Data
US 2024/0090352 A1    Mar. 14, 2024

(51) Int. Cl.
*H10N 70/00* (2023.01)
*H10B 63/00* (2023.01)

(52) U.S. Cl.
CPC ........... *H10N 70/841* (2023.02); *H10B 63/30* (2023.02); *H10N 70/021* (2023.02); *H10N 70/883* (2023.02); *H10N 70/8845* (2023.02)

(58) Field of Classification Search
CPC .................................................. H10N 70/841
See application file for complete search history.

(56) References Cited

U.S. PATENT DOCUMENTS

| | | | |
|---|---|---|---|
| 5,747,361 A | 5/1998 | Quelet |
| 6,404,665 B1 | 6/2002 | Lowrey |
| 6,600,183 B1 | 7/2003 | Visokay |
| 8,867,257 B2 | 10/2014 | Yi |
| 9,007,809 B2 | 4/2015 | Fukumizu |

(Continued)

FOREIGN PATENT DOCUMENTS

| | | |
|---|---|---|
| CN | 105932035 A | 9/2016 |
| CN | 119896063 A | 4/2025 |

(Continued)

OTHER PUBLICATIONS

International Search Report and Written Opinion dated Aug. 3, 2023, for International Application No. PCT/CN2023/091582, filed Apr. 28, 2023.

(Continued)

*Primary Examiner* — Ajay Ojha
*Assistant Examiner* — Hajar Kolahdouzan
(74) *Attorney, Agent, or Firm* — Seed Intellectual Property Law Group LLP (57) ABSTRACT

To limit resistance variability across a resistive random-access memory (RRAM) call, the disclosure includes an RRAM cell with a resistance spreading layer within the RRAM cell between the top and bottom electrodes of the RRAM cell. The resistance spreading layer is in series with and has no impedance with a filament forming layer of the RRAM cell. The resistance spreading layer may be below the filament forming layer or the resistance spreading layer may be above the filament forming layer. The resistance spreading layer may further be in series with and has no impedance with the bottom electrode or the top electrode.

15 Claims, 6 Drawing Sheets

(56) References Cited

U.S. PATENT DOCUMENTS

| | | | |
|---|---|---|---|
| 9,246,094 | B2 | 1/2016 | Wang |
| 9,570,678 | B1 | 2/2017 | Jo |
| 2003/0008456 | A1 | 1/2003 | Kim et al. |
| 2006/0118910 | A1 | 6/2006 | Jin et al. |
| 2010/0085142 | A1 | 4/2010 | Hosoi |
| 2010/0181546 | A1 | 7/2010 | Yamamoto et al. |
| 2012/0224413 | A1 | 9/2012 | Zhang et al. |
| 2012/0267596 | A1 | 10/2012 | Tseng |
| 2013/0078779 | A1 | 3/2013 | Ku |
| 2015/0287914 | A1 | 10/2015 | Ho et al. |
| 2016/0064453 | A1 | 3/2016 | Hou |
| 2016/0141493 | A1 | 5/2016 | Seki |
| 2017/0117464 | A1* | 4/2017 | Chen ............... H10N 70/801 |
| 2017/0141160 | A1 | 5/2017 | Zhang |
| 2017/0229515 | A1 | 8/2017 | Chen |
| 2017/0309324 | A1 | 10/2017 | Kumar |
| 2018/0233665 | A1* | 8/2018 | Chen ............... H10N 70/023 |
| 2019/0131525 | A1* | 5/2019 | Ando ............ H10N 70/8416 |
| 2019/0273205 | A1 | 9/2019 | Ando |
| 2019/0393413 | A1 | 12/2019 | Ando |

FOREIGN PATENT DOCUMENTS

| | | |
|---|---|---|
| GB | 2635637 A | 5/2025 |
| WO | 2024/055597 A1 | 3/2024 |

OTHER PUBLICATIONS

Ambrosi, et al., "Impact of oxide and electrode materials on the switching characteristics of oxide ReRAM devices." Published Sep. 18, 2018 by Royal Society of Chemistry. 12 pages. In Faraday discussions, 213, 87-98. https://doi.org/10.1039/C8FD00106E.

Aziza, et al., "Multi-Level Control of Resistive RAM (RRAM) Using a Write Termination to Achieve 4 Bits/Cell in High Resistance State." Published Sep. 10, 2021 by MDPI. 15 pages. In Electronics, 10(18), 2222. https://doi.org/10.3390/electronics10182222.

Gokmen, et al., "Acceleration of Deep Neural Network Training with Resistive Cross-Point Devices: Design Considerations." Published Jul. 21, 2016 by Frontiers. 13 pages. In Front. Neurosci., Sec.Neuromorphic Engineering. https://doi.org/10.3389/fnins.2016.00333.

Kim et al., "32 x 32 Crossbar Array Resistive Memory Composed of a Stacked Schottky Diode and Unipolar Resistive Memory." Published Oct. 18, 2012 by Wiley Online. 10 pages. In Advanced Functional Materials, vol. 23, Issue 11, pp. 1440-1449. https://doi.org/10.1002/adfm.201202170.

Lentz, et al., "Current Compliance-Dependent Nonlinearity in TiO2 ReRAM." Published Aug. 2013 by IEEE. 3 pages. In IEEE Electron Device Letters, vol. 34, No. 8, pp. 996-998, doi: 10.1109/LED.2013.2265715.

Li, et al., "Resistive Switching Performance Improvement via Modulating Nanoscale Conductive Filament, Involving the Application of Two-Dimensional Layered Materials." Published Apr. 2017 by Research Gate. 36 pages. In Small 13 (35): 1604306. DOI:10.1002/smll.201604306.

Sawa, A., "Resistive switching in transition metal oxides." Published Jun. 2008 by Elsevier. 9 pages. In Materials Today, 11(6), pp. 28-36.

Schonhals, et al., "Critical ReRAM Stack Parameters Controlling Complimentary versus Bipolar Resistive Switching." Published May 2015 by Research Gate. 5 pages. In 2015 IEEE International Memory Workshop (IMW) (pp. 1-4). DOI:10.1109/IMW.2015.7150281.

Waser, et al., "Integration of TiO2 into Nano-Crossbar Arrays with 100 nm Half Pitch for Resistive RAM Applications," Electronic Materials Research Laboratory. Research. http://www.emrl.de/r_a_1.html. Downloaded Sep. 7, 2017. pp. 1-10.

Wong, et al., "Metal-Oxide RRAM." Published Jun. 2012 by IEEE. 20 pages. in Proceedings of the IEEE, vol. 100, No. 6, pp. 1951-1970, doi: 10.1109/JPROC.2012.2190369.

Yu, et al., "Novel Vertical 3d Structure of TaOx-based RRAM with Self-localized Switching Region by Sidewall Electrode Oxidation." Published Feb. 17, 2016 by NIH. 10 pages. In Sci Rep. Feb. 17, 2016;6:21020. doi: 10.1038/srep21020.

* cited by examiner

RESISTIVE MEMORY WITH RESISTANCE SPREADING LAYER

BACKGROUND

The present disclosure relates generally to the field of semiconductor device technology and, more particularly, to resistive random-access memory (RRAM) cells that include a resistance spreading layer located between a top electrode and a bottom electrode.

A metal-insulator-metal (MIM) device can be employed within integrated circuits. A MIM device includes a MIM dielectric situated between metal plates, which form electrodes of the MIM device. MIM devices are used for various applications, such as dynamic random-access memory (DRAM) capacitors and decoupling capacitors, as well as for RRAM devices.

A typical RRAM device includes a typical RRAM cell with the filament-forming layer being in series and with no impedance against both electrodes. The filament-forming layer, which is normally insulating, can be made to conduct through a filament or conduction path formed after the application of a sufficiently high voltage. The conduction path can arise from different mechanisms, including vacancy or metal defect migration. Once the filament is formed, it can be reset (broken, resulting in a high resistance) or set (re-formed, resulting in lower resistance) by another voltage. Thus, in one operational state, there is a presence of at least one current path through the filament-forming layer.

Figure 1A:
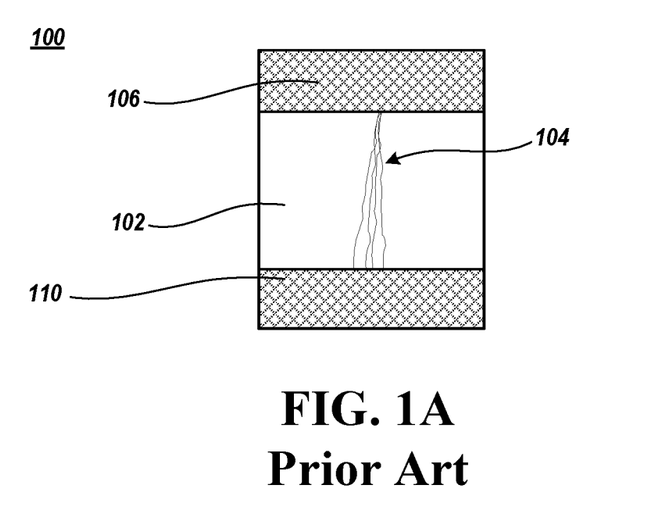
FIG. 1A depicts a cross-sectional view of a prior art RRAM cell.
Figure 1B:
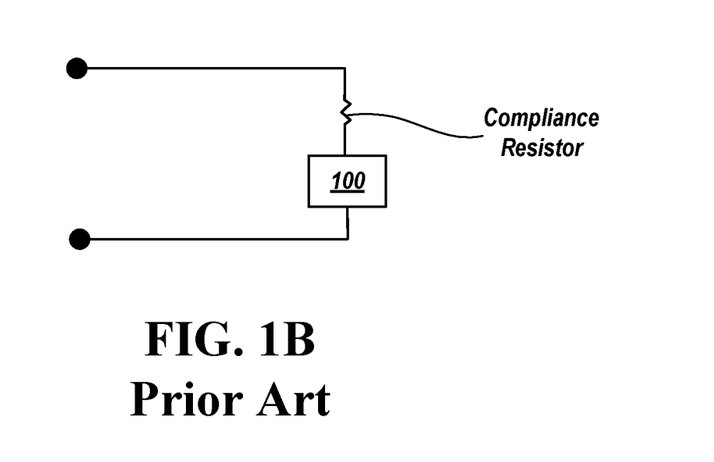
FIG. 1B depicts a schematic of a prior art circuit that includes the RRAM cell of FIG. 1A.

For traditional RRAM cells to be utilized in traditional high voltage applications, such high voltage is typically reduced at the input electrode of the RRAM cell. A solution to this problem is exemplarily depicted in a prior art RRAM cell 100 of FIG. 1A and in a prior art circuit of FIG. 1B, in which voltage is stepped down or lowered at the RRAM cell 100 by a large compliance resistor (e.g., a transistor). The compliance resistor has been typically placed in series with the RRAM cell 100 and has relatively reduced the voltage seen by the RRAM cell 100. The compliance resistor has been traditionally placed external to the RRAM cell 100 (i.e., not between the top electrode 106 and bottom electrode 110 therein). The RRAM cell 100 and circuit may result in filament(s) 104 being relatively narrow (e.g., relatively few oxygen vacancies in their formation, etc.) leading to relatively large resistance variability across the filament(s) 104 within the same or different RRAM cells 100, respectively. This resistance variability may make these known techniques and structures unsuitable or otherwise less desirable for high voltage applications.

SUMMARY

In some embodiments of the present disclosure, a resistive random-access memory (RRAM) cell is presented. The RRAM cell includes a bottom electrode below and is in direct contact with a resistance spreading layer. The RRAM cell further includes a top electrode above and in direct contact with a filament-forming layer. Current flows through the top electrode and produces a filament within the filament-forming layer that electrically connects the bottom of the top electrode with the top of the resistance spreading layer. The resistance spreading layer radially propagates the current flow from the top of the resistance spreading layer to the bottom of the resistance spreading layer into the bottom electrode.

In some implementations, there is no impedance between an entire upper surface of the filament forming layer and an entire bottom surface of the top electrode. Similarly, there may be no impedance between an entire bottom surface of the filament forming layer and an entire upper surface of the resistance spreading layer. Likewise, there may be no impedance between an entire bottom surface of the resistance spreading layer and an entire upper surface of the bottom electrode.

Respective sidewalls of the bottom electrode, the resistance spreading layer, the filament forming layer, and the top electrode may be coplanar. The resistance spreading layer may be between the top electrode and the bottom electrode. In some implementations, the top electrode may be a titanium nitride (TiN) top electrode, the bottom electrode may be a TiN bottom electrode, the filament forming layer may be a transition metal oxide filament forming layer, and the resistance spreading layer may be an aluminum carbide (AlC) resistance spreading layer.

In some embodiments of the present disclosure, another resistive random-access memory (RRAM) cell is presented. The RRAM cell includes a top electrode above and in direct contact with a resistance spreading layer. The RRAM cell further includes a bottom electrode below and in direct contact with a filament-forming layer. Current flow through the bottom electrode and produces a filament within the filament-forming layer that electrically connects the top of the bottom electrode with the bottom of the resistance spreading layer. The resistance spreading layer radially propagates the current flow from the bottom of the resistance spreading layer to the top of the resistance spreading layer into the top electrode.

In some implementations, there is no impedance between an entire bottom surface of the filament forming layer and an entire upper surface of the bottom electrode. Similarly, there is no impedance between an entire upper surface of the filament forming layer and an entire bottom surface of the resistance spreading layer. Likewise, there is no impedance between an entire upper surface of the resistance spreading layer and an entire bottom surface of the top electrode.

In some implementations, respective sidewalls of the bottom electrode, the resistance spreading layer, the filament forming layer, and the top electrode are coplanar. The resistance spreading layer is between the top electrode and the bottom electrode. In some implementations, the top electrode is a titanium nitride (TiN) top electrode, the bottom electrode is a TiN bottom electrode, the filament forming layer is a transition metal oxide filament forming layer, and the resistance spreading layer is an aluminum carbide (AlC) resistance spreading layer.

In other embodiments of the present disclosure, a resistive random-access memory (RRAM) cell fabrication method is presented. The method includes forming a bottom electrode above and vertically in line with a bottom wire. The method further includes forming a filament-forming layer directly upon the bottom wire. The method further includes forming a resistance spreading layer directly upon the filament-forming layer. The method further includes forming a top electrode directly upon the filament-forming layer.

In some implementations, the method further includes forming a sacrificial cap directly upon the top electrode and/or forming an encapsulation spacer upon a sidewall of the bottom electrode, upon a sidewall of the resistance spreading layer, upon a sidewall of the filament forming layer, and upon a sidewall of the top electrode.

In some implementations, the method further includes forming an inter-layer dielectric (ILD) over an upper surface of the sacrificial cap and/or etching a top wire trench within the ILD. The etch removes the sacrificial cap and exposes at least a portion of the top electrode. The method further includes forming a top wire within the top wire trench and upon the exposed portion of the top electrode.

These embodiments provide methods and structures for increasing resistance through the RRAM cell between the top and bottom electrodes thereof. Such high resistance capable RRAM cells may be a contender for future random access memory implementations and for memory-in-logic applications, such as artificial synapses. Artificial resistive synapse arrays, in the form of analog Resistive Processing units (RPU), have been shown to have great potential to speed up the learning process in Artificial Neural Networks compared to all digital solutions. Resistors at each crosspoint of the RPU array constitute the neuromorphic weight and should be capable of being programmed over a roughly linear range of conductance. Large arrays of RPUs, needed for high processing throughput, require large values of resistance for the crosspoints of the order of megaohms.

Therefore, to limit resistance variability, embodiments of the present disclosure recognize that the RRAM cell may include the resistance spreading layer within the RRAM cell between the top and bottom electrodes of the RRAM cell in series and with no impedance against the filament-forming layer. In one embodiment, the resistance spreading layer may be below the filament-forming layer, such that the resistance spreading layer is nearer to the bottom electrode relative to the filament-forming layer. In another embodiment, the resistance spreading layer may be above the filament-forming layer, such that the resistance spreading layer is nearer to the top electrode relative to the filament-forming layer.

The embodiments of the present disclosure, therefore, result in current through the filament(s) being forced to radially spread through the resistance spreading layer rather than uniformly spread through the conductive electrode, as in RRAM cell 100. The result is high spreading resistance in series with the filament, where the resistance of the filament is inversely proportional to the filament diameter. When the filament resistance is much less than the resistance through the resistance spreading layer, the total resistance between the top electrode and bottom electrode can be controlled by varying the geometry of the resistance spreading layer along with controlling the radial distance of a grouping of filaments (e.g., by controlling the number of filaments within a particular filament group, etc.). As such, the variability of the total resistance between the top electrode and bottom electrode can be reduced.

The embodiments of the present disclosure, also result in current flow through the resistance spreading layer producing a localized potential drop there across so that most of the potential drop occurs within a radial distance of a few filament diameters. Consequently, multiple filaments may be formed independently, a few filament diameters apart, where one path does not steal voltage from its neighbor. This gives a multi-filament mode of operation, where the total conductance between the top electrode and bottom electrode is proportional to the number of filaments. Here, the large number of filaments helps to reduce the variability of the total resistance between the top electrode and bottom electrode, which may still be mostly controlled by the predetermined geometry of the resistance spreading layer.

The above and other aspects, features, and advantages of various embodiments of the present disclosure will be more apparent from the following description taken in conjunction with the accompanying drawings.

BRIEF DESCRIPTION OF THE DRAWINGS

The above and other aspects, features, and advantages of various embodiments of the present disclosure will be more apparent from the following description taken in conjunction with the accompanying drawings.

DETAILED DESCRIPTION

Referring now to FIG. 2 through FIG. 13, wherein like components are labeled with like numerals, exemplary embodiments that involve a semiconductor carrier, semiconductor device, such as a wafer, chip, integrated circuit, microdevice, etc. in accordance with embodiments of the present disclosure are shown and will now be described in greater detail below. It should be noted that while this description may refer to components in the singular tense, more than one component may be depicted throughout FIG. 2 through FIG. 13. The specific number of components depicted in FIG. 2 through FIG. 13 and the orientation or cross-section view of the applicable structural figures was chosen to best illustrate the various embodiments described herein.

Figure 2:
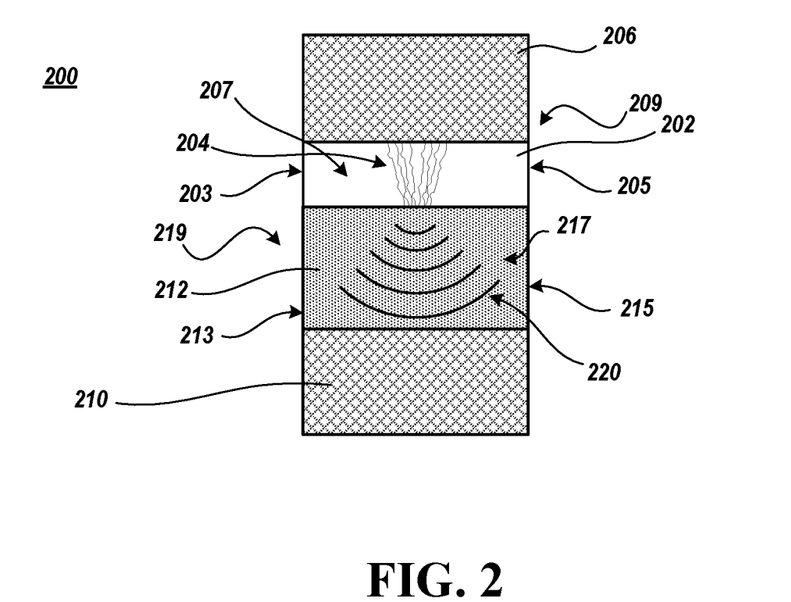
FIG. 2 depicts a cross-sectional view of an RRAM cell that includes a resistance spreading layer located between a top electrode and a bottom electrode, in accordance with embodiments of the present disclosure.

FIG. 2 depicts a cross-sectional view of RRAM cell 200 that includes a resistance spreading layer 212 located between top electrode 206 and bottom electrode 210, in accordance with embodiments of the present disclosure.

RRAM cell 200 is an exemplary non-volatile solid-state memory that exploits the change of resistance across filament forming layer 202 under an applied electric field. RRAM cell 200 can be programmed into two or more different states, or levels, which exhibit different resistance characteristics. The programmable cell-states can be used to represent different data values, permitting storage of information.

RRAM cell 200 may include a MIM structure. The structure comprises insulating layers (I) sandwiched between the two metal (M) electrodes. The application of a voltage pulse across the RRAM cell 200 enables a transition of the device from an insulating state (HRS), or OFF state generally referred to as logic value '0', to a low resistance state (LRS), or ON state generally referred as logic value '1' and vice versa.

Typically, an as-prepared RRAM cell 200 is initially in the HRS. To switch the device from the HRS to the LRS, the application of voltage (e.g., high voltage pulse, etc.) enables the formation of conductive paths, which may be referred to as filaments 204, in the filament-forming layer 202 and the RRAM cell 200 is switched into the LRS. This process which occurs due to the soft breakdown of the metal-insulator metal (MIM) structure, is usually referred to as 'electroforming' and the voltage at which this process occurs is referred to as forming voltage. To switch the RRAM cell 200 from the LRS to HRS, a voltage pulse referred to as the RESET voltage may be applied.

To read data from RRAM cell 200, a read voltage that will not disturb the current state of RRAM cell 200 is applied to determine whether the cell is in the logic 0 (HRS) or the logic 1 (LRS) state. Since both LRS and HRS retain their respective values even after the removal of applied voltage, RRAM cell 200 is a non-volatile memory.

The switching of the RRAM cell 200 is based on the growth of conductive filament(s) 204 inside the filament-forming layer 202. The conductive filament(s) 204 may also be referred to as a channel having a diameter of the order of nanometers which connects a respective top electrode 206 or bottom electrode 210 with resistance spreading layer 212 of the RRAM cell 200. The low LRS with high conductivity is obtained when the conductive filament(s) 204 are formed across the filament-forming layer 202 thickness (as depicted), and the HRS results when the conductive filament(s) 204 is disconnected with a conductive filament(s) 204 gap across the filament-forming layer 202.

In some implementations, RRAM cell 200 may have more than two programmable states, permitting storage of more than one bit per RRAM cell 200. The different programmable states correspond to different relative proportions of the conductive filament(s) 204 across the filament-forming layer 202. In particular, RRAM cell 200 can have an intermediate state in which the RRAM cell 200 contains different volumes of conductive filament(s) 204 or numbers of distinct conductive filament(s) 204. Since the LRS and HRS exhibit a large resistance contrast, varying the size of conductive filament(s) 204 within the overall RRAM cell 200 or increasing the number of conductive filament(s) 204 produces a corresponding variation in RRAM cell 200 resistance.

RRAM cell 200 includes a bottom electrode 210, top electrode 206, and dual RRAM layers between the bottom electrode 210 and top electrode 206. The dual RRAM layers are the resistance spreading layer 212 and the filament-forming layer 202. The resistance spreading layer 212 may be below the filament-forming layer 202, as depicted. In this embodiment, the resistance spreading layer 212 is directly below, in series with, and in direct contact with the filament-forming layer 202. As such, there is substantially no electrical impedance between the resistance spreading layer 212 and the filament-forming layer 202.

In the depicted implementation, RRAM cell 200 may be a column, pillar, or the like. One or more sidewall(s) of the RRAM cell 200 may be coplanar. For example, filament-forming layer 202 may include a side surface 203, a side surface 205, a front surface 207, and a rear surface 209. Resistance spreading layer 212 may include a side surface 213, a side surface 215, a front surface 217, and a rear surface 219. Side surfaces 203, 213 may be coplanar, side surfaces 205, 215 may be coplanar, front surfaces 207, 217 may be coplanar, and rear surfaces 209, and 219 may be coplanar. Top electrode 206 and bottom electrode 210 may have similar side, front, and rear surfaces, which may also be coplanar with the associated surfaces of resistance spreading layer 212 and filament-forming layer 202, respectively. As such, respective sidewalls of a pillar, column, or the like, shaped RRAM cell 200 may be coplanar.

To limit resistance variability across RRAM cell 200, resistance spreading layer 212 is located within the RRAM cell 200 between top electrode 206 and bottom electrode 210 in series and with no impedance against the filament-forming layer 202. For example, there is no impedance between an entire upper surface of the filament forming layer and an entire bottom surface of the top electrode. In one instance, therefore, the entire upper surface of the filament forming layer is in direct mechanical and electrical contact with the entire bottom surface of the top electrode.

The embodiments of the present disclosure, therefore, result in current 220 through the filament(s) 204 being forced to radially spread through the resistance spreading layer 212 rather than uniformly spread. Based upon the conductive properties of conductive electrodes 210 and 206, current 220 will uniformly spread through the conductive electrodes 210 and 206, respectively. The result is high spreading resistance in series with filament 204, where the resistance of the filament 204 is inversely proportional to the filament 204 diameter. When the filament 204 resistance is much less than the resistance through the resistance spreading layer 212, the total resistance between the top electrode 206 and bottom electrode 210 can be controlled by varying the geometry or material (e.g., thickness, or the like) of the resistance spreading layer 212 along with controlling filament 204 diameter. As such, the variability of the total resistance between the top electrode 206 and bottom electrode 210 can be reduced.

The embodiments of the present disclosure, therefore, also result in current flow through the resistance spreading layer 212, producing a localized potential drop there across so that most of the potential drop occurs within a radial distance of a few filament diameters. Consequently, multiple filaments 204 may be formed independently within filament forming layer 202, a few filament diameters apart, where one path does not steal voltage from its neighbor. This gives a multiple filament 204 mode of operation, where the total conductance between the top electrode 206 and bottom electrode 210 is proportional to the number of filaments 204. Here, the large number of filaments 204 helps to reduce the variability of the total resistance between the top electrode 206 and bottom electrode 210, which may still be mostly controlled by predetermined geometry or material selection of the resistance spreading layer 212.

FIGS. 3-7 depict fabrication stages of forming a semiconductor device 300. Specifically, the method discussed with respect to FIGS. 3-7 relates to semiconductor device 300 that is fabricated to include RRAM cell 200 as depicted in FIG. 2 or in FIG. 12.

For purposes of the description hereinafter, the terms "upper," "lower," "right," "left," "vertical," "horizontal," "top," "bottom," and derivatives thereof relate to the described structures and methods, as oriented in the drawing figures. The terms "overlying," "atop," "on top," "positioned on," or "positioned atop" mean that a first element, such as a first structure, is present on a second element, such as a second structure, wherein intervening elements such as an interface structure can be present between the first element and the second element. The term "direct contact," or the like, means that a first element, such as a first structure, and a second element, such as a second structure, are connected without any intermediary conducting, insulating, or semiconductor layers at the interface of the two elements. It should be noted that the term "selective to," such as, for example, "a first element selective to a second element," means that the first element can be etched, and the second element can act as an etch stop.

The terms "about," "substantially," "approximately," and variations thereof are intended to include the degree of error associated with measurement of the quantity based upon the equipment available at the time of filing the application. For example, substantial coplanarity between various materials can include an appropriate manufacturing tolerance of ±8%, ±5%, or ±2% difference between the coplanar materials.

For the sake of brevity, conventional techniques related to a semiconductor device and integrated circuit (IC) fabrication may or may not be described in detail herein. Moreover, the various tasks and process steps described herein can be incorporated into a more comprehensive procedure or process having additional steps or functionality not described in detail herein. Various steps in the manufacture of semiconductor devices and semiconductor-based ICs are well known, and so, in the interest of brevity, many conventional steps will only be mentioned briefly herein or will be omitted entirely without providing the well-known process details.

In general, the various processes used to form a microchip that will be packaged into an IC fall into four general categories, namely, film deposition, removal/etching, semiconductor doping, and patterning/lithography. A deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE), and, more recently, atomic layer deposition (ALD), among others. Removal/etching is any process that removes material from the wafer. Examples include etch processes (either wet or dry), chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., polysilicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light-sensitive polymer called a photoresist. To build the complex structures that make up a transistor and the many wires that connect the millions of transistors of a circuit, lithography and etch pattern transfer steps are repeated multiple times. Each pattern printed on the wafer is aligned to the previously formed patterns, and slowly the conductors, insulators, and selectively doped regions are built up to form the final device.

Figure 3:
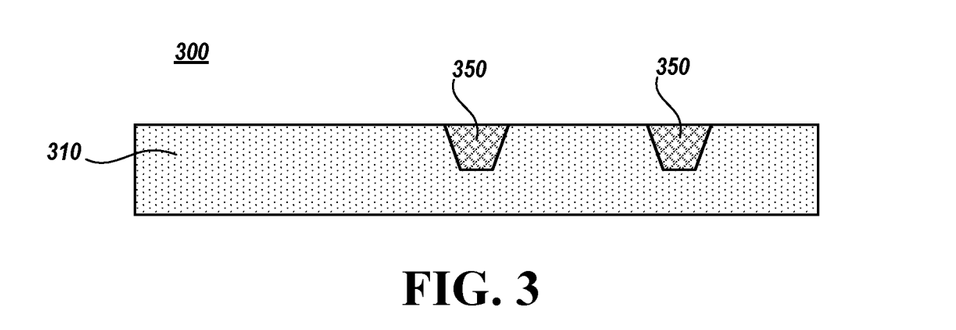
FIG. 3 through FIG. 11 are cross-sectional fabrication views of a semiconductor device that includes an RRAM cell with the resistance spreading layer, in accordance with embodiments of the present disclosure.

FIG. 3 depicts a cross-sectional fabrication view of semiconductor device 300, in accordance with embodiments of the present disclosure. At the present stage of fabrication, bottom wire(s) 350 may be formed upon or within substrate 310.

Semiconductor device 300 may be an integrated circuit (IC) chip. IC chips can be distributed by the fabricator in raw wafer form (that is, as a single wafer that has multiple unpackaged chips), as a bare die, or in a packaged form. In the latter case, the IC chip may mount in a single chip package (such as a plastic carrier, with leads that are affixed to a motherboard or other higher level carrier) or in a multichip package (such as a ceramic carrier that has either or both surface interconnections or buried interconnections). In any case, the IC chip may be integrated with other chips, discrete circuit elements, and/or other signal processing devices as part of either (a) an intermediate product, such as a motherboard, or (b) an end product. The end product can be any product that includes the IC chip, ranging from toys and other low-end applications to advanced computer products having a display, a keyboard or other input device, and a central processor.

In one or more embodiments, the substrate 310 can be a semiconductor or an insulator with an active surface semiconductor layer. The substrate 310 can be crystalline, semi-crystalline, microcrystalline, or amorphous. The substrate 310 can be essentially (i.e., except for contaminants) a single element (e.g., silicon), primarily (i.e., with doping) of a single element, for example, silicon (Si) or germanium (Ge), or the substrate 310 can include a compound, for example, GaAs, SiC, or SiGe. The substrate 310 can also have multiple material layers.

In some implementations, substrate 310 may be an interlayer dielectric (ILD) layer whereby additional layer(s) and/or structures or components of semiconductor device 300 have previously been fabricated there below. The ILD can have a composition that is selected from the group consisting of silicon-containing materials such as $SiO_2$, $Si_3N_4$, $SiO_xN_y$, SiC, SiCO, SiCOH, and SiCH compounds, the above-mentioned silicon-containing materials with some or all of the Si replaced by Ge, carbon doped oxides, inorganic oxides, inorganic polymers, hybrid polymers, organic polymers such as polyamides or SiLK™, other carbon-containing materials, organo-inorganic materials such as spin-on glasses and silsesquioxane-based materials, and diamond-like carbon (DLC), also known as amorphous hydrogenated carbon, α-C:H).

Bottom wire 350 may be formed of one or more material(s), material layers, or the like that are utilized as IC device wires, such as, for example Copper, Tungsten, Platinum, Titanium Nitride, Tantalum Nitride, Titanium Aluminum Nitride, or the like.

Bottom wire 350 may be formed within the substrate 310 by conductive wire fabrication techniques. For example, trench(es) may be formed within the substrate 310 by known photolithographic techniques and then filled with the bottom wire 350 conductive material. Chemical mechanical planarization, or other known methods, may be used to remove excess bottom wire 350 material from the upper surface of substrate 310 so that the upper surface of substrate 310 and the upper surface(s) of bottom wire(s) 350 are coplanar.

Figure 11:
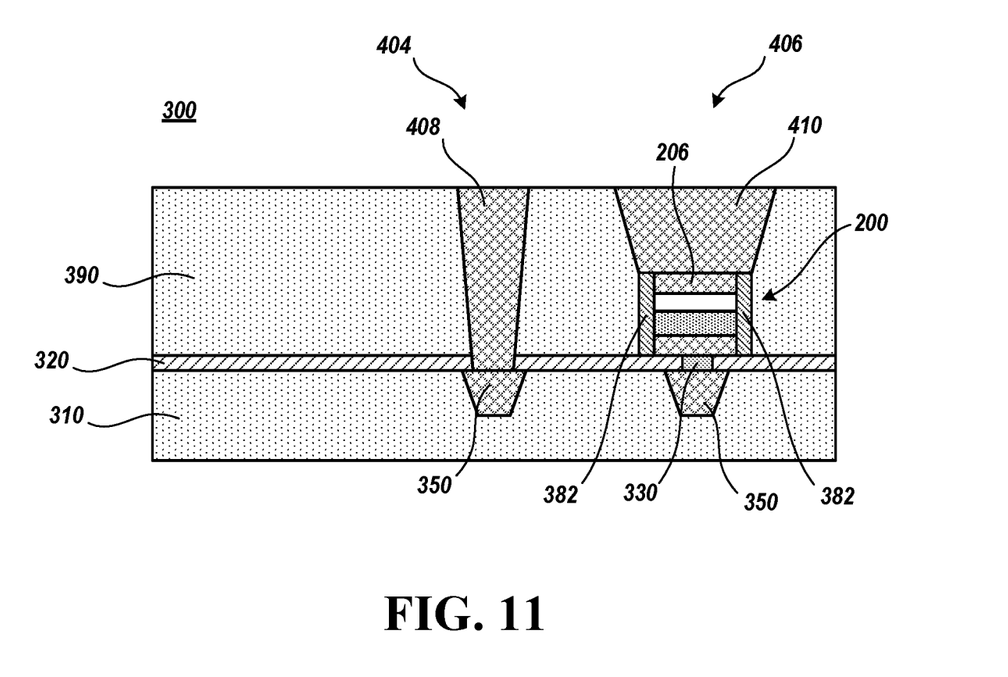

Bottom wire 350 may be electrically connected to other components of the semiconductor device 300 by one or more electrical pathways. For example, one or more electrical pathways (e.g., VIAs, wires, or the like) may connect bottom wire 350 with a memory controller or the like. In this manner, components of the semiconductor device 300, or connected to the semiconductor device 300, may be electrically connected to the RRAM cell 200 via the bottom wire 350 and/or the top wire 410, as depicted in FIG. 11.

Figure 4:
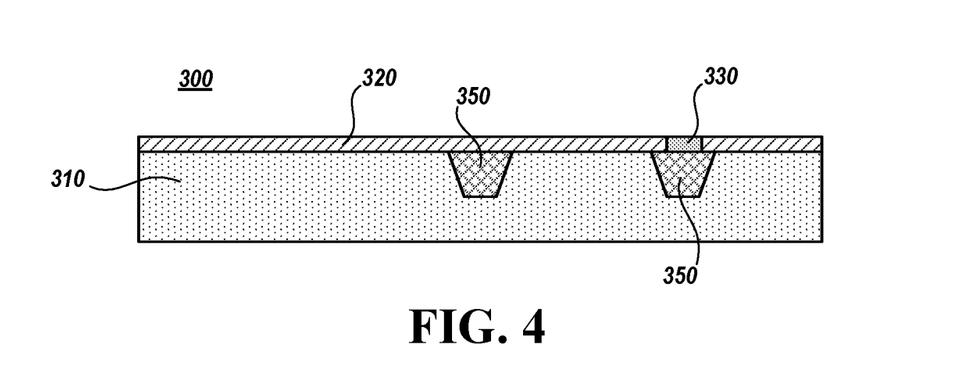

FIG. 4 depicts a cross-sectional fabrication view of semiconductor device 300, in accordance with embodiments of the present disclosure. At the present stage of fabrication, encapsulation layer 320 may be formed upon substrate 310 and upon bottom wire(s) 350, and bottom electrode(s) 330 may be formed within encapsulation layer 320.

Encapsulation layer 320 may be, for example, a Silicon layer or Silicon-based layer such as a Silicon Nitride layer and may be formed upon substrate 310 by one or more deposition processes. A bottom electrode 330 is formed within the encapsulation layer 320 with conductive material deposition techniques. For example, a trench may be formed within the encapsulation layer 320 utilizing known photolithography techniques to expose an underlying portion of an associated bottom wire 350. This trench may be filled with conductive bottom electrode 330 material. A CMP or polish may be used to remove excess bottom electrode 330 material from the upper surface of encapsulation layer 320. The bottom electrode 330 material may be any generally conductive material that is used as an electrode, such as, for example, Tungsten, Platinum, Titanium Nitride, Tantunum Nitride, Titanium Aluminum Nitride, or the like.

In certain implementations, the bottom electrode 330 trench is formed through the encapsulation layer 320, thereby exposing a portion of an upper surface of a bottom wire 350 previously formed in substrate 310. As such, the bottom electrode 330 may contact bottom wire 350 such that there is substantially no, or minimal, the electrical impedance between the bottom electrode 330 may contact bottom wire 350.

Figure 5:
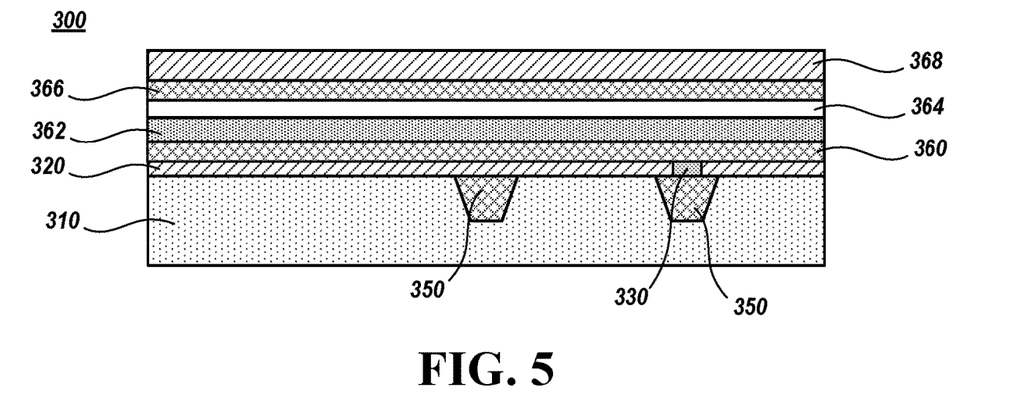

FIG. 5 depicts a cross-sectional fabrication view of semiconductor device 300, in accordance with embodiments of the present disclosure. At the present stage of fabrication, RRAM cell 200 buildup layers are fabricated.

For example, to fabricate an RRAM cell 200, as depicted in FIG. 2, bottom electrode material layer 360 is formed upon the encapsulation layer 320, resistance spreading layer 362 is formed upon the bottom electrode material layer 360, filament-forming layer 364 is formed upon resistance spreading layer 362, top electrode material layer 366 is formed upon the filament-forming layer 364, and/or a capping layer 368 is formed upon the top electrode material layer 366.

Figure 12:
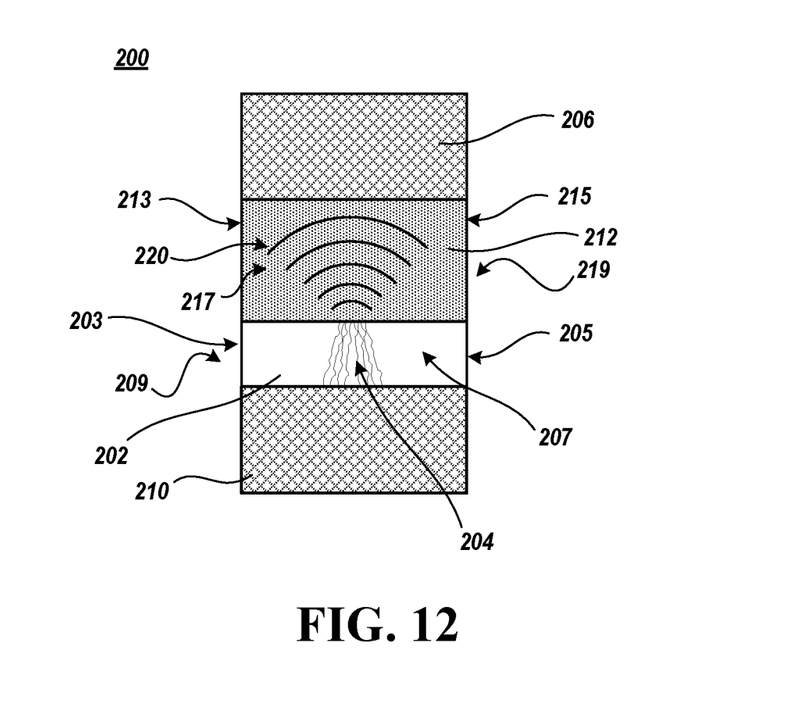
FIG. 12 depicts a cross-sectional view of an RRAM cell that includes a resistance spreading layer located between a top electrode and a bottom electrode, in accordance with embodiments of the present disclosure.

For example, to fabricate an RRAM cell 200, as depicted in FIG. 12, bottom electrode material layer 360 is formed upon the encapsulation layer 320, filament-forming layer 364 is formed upon bottom electrode material layer 360, resistance spreading layer 362 is formed upon the filament-forming layer 364, top electrode material layer 366 is formed upon the resistance spreading layer 362, and/or a capping layer 368 is formed upon the top electrode material layer 366.

Bottom electrode material layer 360 may be formed by depositing electrically conductive electrode material, such as Titanium Nitride, onto the encapsulation layer 320 and/or onto the electrode 330. Bottom electrode material layer 360 may be formed to a thickness between 5 and 75 nm. In a particular embodiment, bottom electrode material layer 360 may be formed to a thickness between 20 and 30 nm.

Resistance spreading layer 362 may be formed by depositing a dielectric material, such as aluminum carbide (AlC). Resistance spreading layer 362 may be formed to a thickness between 2 and 50 nm. In a particular embodiment, resistance spreading layer 362 may be formed to a thickness between 5 and 10 nm.

Resistance spreading layer 362 should support high electric fields and high current density. For instance, a 1 mega ohm resistor with filament 204 that has a 10 nm diameter, biased at 1V, carries a current density of $1.3 \times 10^6$ A/cm2 and a maximum field of 2.6 MV/cm. An adventurous material that can undergo many cycles of programming and one where the mean free path (MFP) is very short. The short MFP ensures that resistive behavior is maintained even over very short distances but longer than the MFP, and that the electrons do not acquire inadequately high energy from the field. Suitable materials of resistance spreading layer 362 should be highly disordered, such as an amorphous semiconductor material.

Filament forming layer 364 may be formed by depositing a filament-forming a metal oxide material, such as hafnium oxide ($HfO_x$), tantalum oxide ($TaO_x$), or titanium oxide ($TiO_x$). Filament forming layer 364 can also be referred to as an RRAM cell insulating layer. In other embodiments, the filament-forming layer 364 can also be referred to as an oxygen-deficient metal oxide layer, a transition metal oxide layer, or the like. Filament forming layer 364 may be formed to a thickness between 2 and 50 nm. In a particular embodiment, filament-forming layer 364 may be formed to a thickness between 4 and 8 nm.

Top electrode material layer 366 may be formed by depositing electrically conductive electrode material, such as Titanium Nitride. Top electrode material layer 366 is generally, but not required, formed of the same material as the material of the bottom electrode material layer 360. Top electrode material layer 366 may be formed to a thickness between 5 and 75 nm. In a particular embodiment, top electrode material layer 366 may be formed to a thickness between 15 and 25 nm.

Capping layer 368 may be formed by depositing a dielectric material, such as Silicon Nitride, or the like upon top electrode material layer 366. Capping layer 368 may be a mask layer and may be formed to a thickness between 10 and 80 nm. In a particular embodiment, capping layer 368 may be formed to a thickness between 30 and 40 nm.

Figure 6:
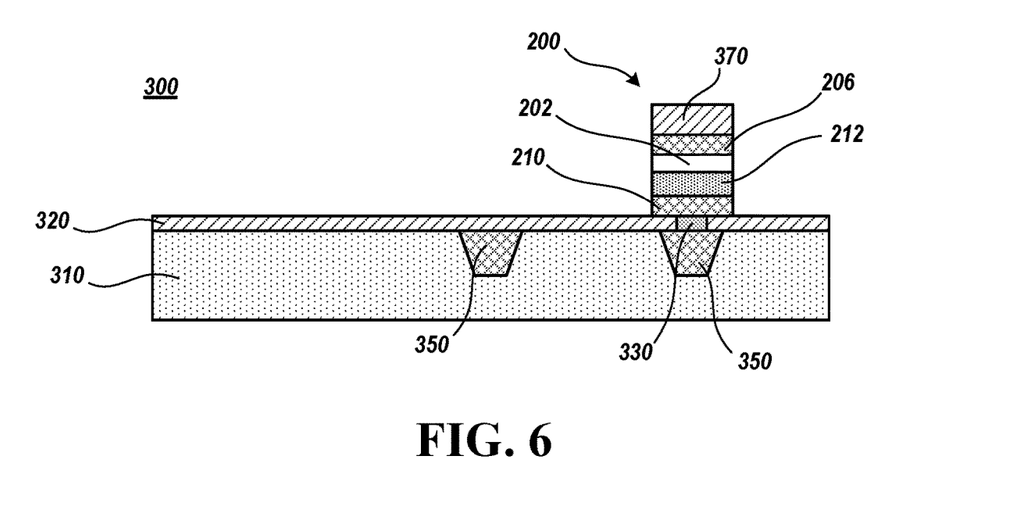

FIG. 6 depicts a cross-sectional fabrication view of semiconductor device 300, in accordance with embodiments of the present disclosure. At the present stage of fabrication, RRAM cell 200 is formed by patterning the RRAM cell buildup layers. For example, an etching technique removes undesired or exposed RRAM cell buildup layer portions and retains desired RRAM cell buildup layer portions to form one or more RRAM cells 200.

Photolithography techniques may be utilized to develop or pattern the capping layer 368 to leave portions of the capping layer 368 upon the top layer of the cell build-up layer, thereby defining and protecting the RRAM cell 200 layers there below from an etchant of a chemical etch or high energy kinetic energy (ion, electron, or photon) beams of a dry etch. The protected underlying desired RRAM cell 200 layers are thereby retained and effectively form RRAM cell 200. The etching technique generally removes the undesired RRAM cell 200 layer portions and generally exposes the encapsulation layer 320 in the field, generally outside of the formed RRAM cell 200.

The etch technique may be a physical or dry etch technique, or a chemical wet etch. In a preferred implementation, the etch technique is a physical dry etch, and, as such, there is less risk for damage (e.g., limited lateral etching of the RRAM cell 200-layer materials may be experienced due to the lack of chemical etchants) to the formed RRAM cell 200 materials.

As depicted, the formed RRAM cell 200 includes a bottom electrode 210 formed from a retained portion of the bottom electrode material layer 360, resistance spreading layer 212 formed from a retained portion of the resistance spreading layer 362, filament-forming layer 202 formed from a retained portion of the filament-forming layer 364, and top electrode 206 formed from a retained portion of the top electrode material layer 366. In the present fabrication stage, RRAM cell 200 may further include sacrificial cap 370 formed from a retained portion of the capping layer 368.

Figure 7:
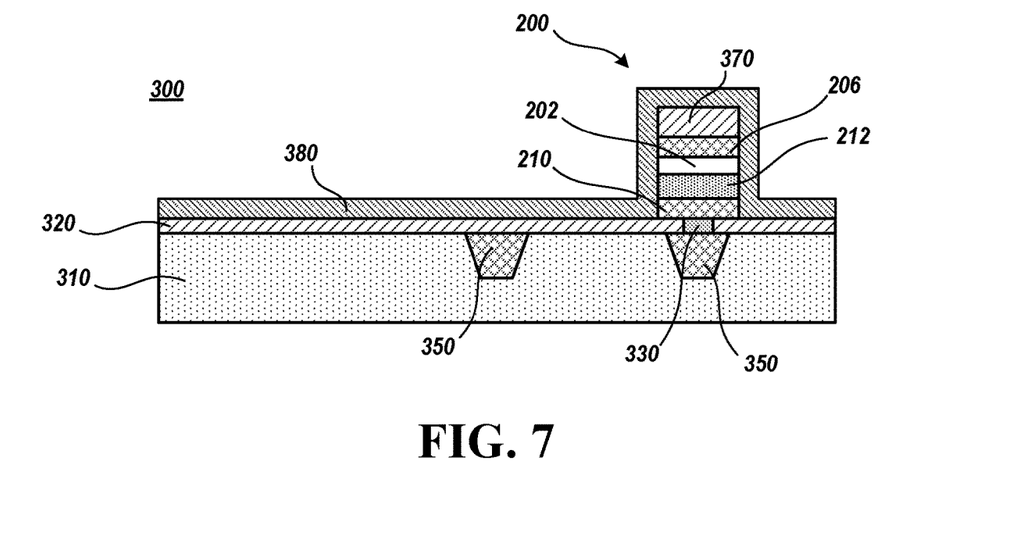

FIG. 7 depicts a cross-sectional fabrication view of semiconductor device 300, in accordance with embodiments of the present disclosure. At the present stage of fabrication, encapsulation layer 380 is formed upon encapsulation layer 320 and upon and around one or more RRAM cells 200.

Encapsulation layer 380 is a dielectric material layer that helps prevent or limit shorting between the various RRAM cell 200 layers. For example, spacers 383, depicted in FIG. 8, formed from encapsulation layer 380, prevent bottom electrode 210 and top electrode 206 from contacting via the side surfaces of RRAM cell 200.

Encapsulation layer 380 may be formed by depositing a dielectric conformal and insulating material, such as Silicon Nitride, Silicon Oxide, Silicon oxynitride, amorphous Carbon, Aluminium nitride, or the like, upon the exposed encapsulation layer 320 and upon and around the RRAM cell(s) 200. For example, encapsulation layer 380 may be formed by depositing a blanket dielectric material layer upon the previously exposed encapsulation layer 320, upon the sidewall(s) or side surface(s) of the RRAM cell(s) 200, and upon the upper surface of RRAM cell(s) 200.

The thickness of the encapsulation layer 380 may be sufficiently thick to protect the cell stack 380 during subsequent etching of the undesired portions of the encapsulation spacer layer 380 such that the undesired encapsulation spacer layer 380 may be removed from the field while being retained upon the RRAM cell(s) 200 sidewall(s) or side surface(s). For example, encapsulation layer 380 may be formed to a thickness between 2 and 100 nm. In a particular embodiment, encapsulation layer 380 may be formed to a thickness between 10 and 20 nm.

Figure 8:
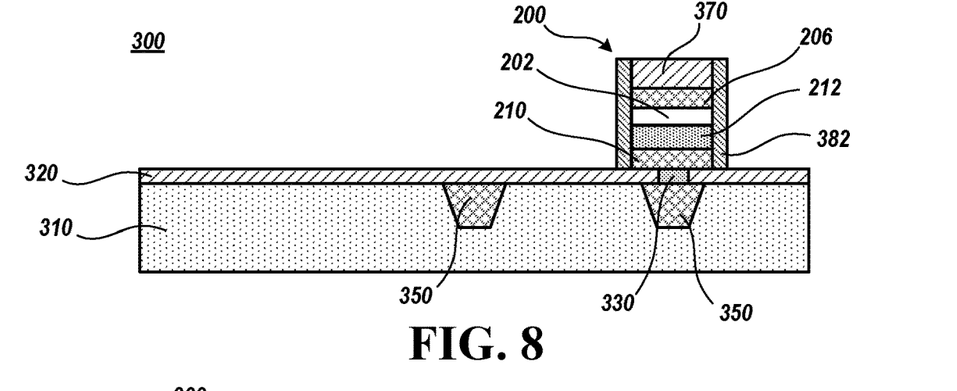

FIG. 8 depicts a cross-sectional fabrication view of semiconductor device 300, in accordance with embodiments of the present disclosure. At the present stage of fabrication, encapsulation spacer 382 is formed from encapsulation layer 380 around RRAM cell 200.

Encapsulation spacer 382 may be formed by removing undesired encapsulation layer 380 portion(s) and retaining desired encapsulation layer 380 portion(s) that are upon the sidewall(s) of RRAM cell 200.

Known directional etch techniques may be utilized to etch away or otherwise remove the undesired encapsulation layer 380 portion(s). These undesired encapsulation layer 380 portion(s) may be generally horizontal (i.e., the encapsulation layer 380 portion(s) with a width greater than height). The directional etch process may retain the desired encapsulation layer 380 portion(s) that are upon the sidewall(s) of the encapsulation layer 380. These desired encapsulation layer 380 portion(s) may be generally vertical, as depicted in the cross-section view of FIG. 8 (i.e., layer portion(s) with a height greater than width).

The etch technique may be a physical or dry etch technique, or a chemical wet etch. In a preferred implementation, the etch technique is a chemical wet etch. As such, the encapsulation layer 320 may be configured to be a etch stop. For clarity, the present fabrication stage may be omitted if it is desired for ILD 390, shown, for example in FIG. 9, to surround the sides and top of the RRAM cell 200.

Figure 9:
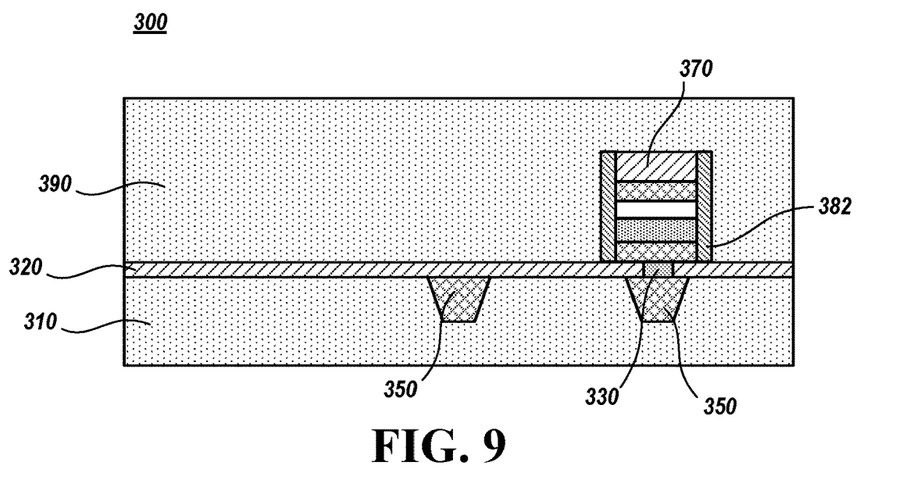

FIG. 9 depicts a cross-sectional fabrication view of semiconductor device 300, in accordance with embodiments of the present disclosure. At the present stage of fabrication, ILD 390 is formed upon encapsulation layer 320 and around RRAM cell 200.

ILD 390 may be formed by depositing a blanket layer of dielectric material, such as a low-k dielectric material, upon the encapsulation layer 320, encapsulation spacer 382, and sacrificial cap 370, as appropriate or desired. ILD 390 may be formed to a thickness generally greater than the height, or generally above, the upper surface of sacrificial cap 370.

Figure 10:
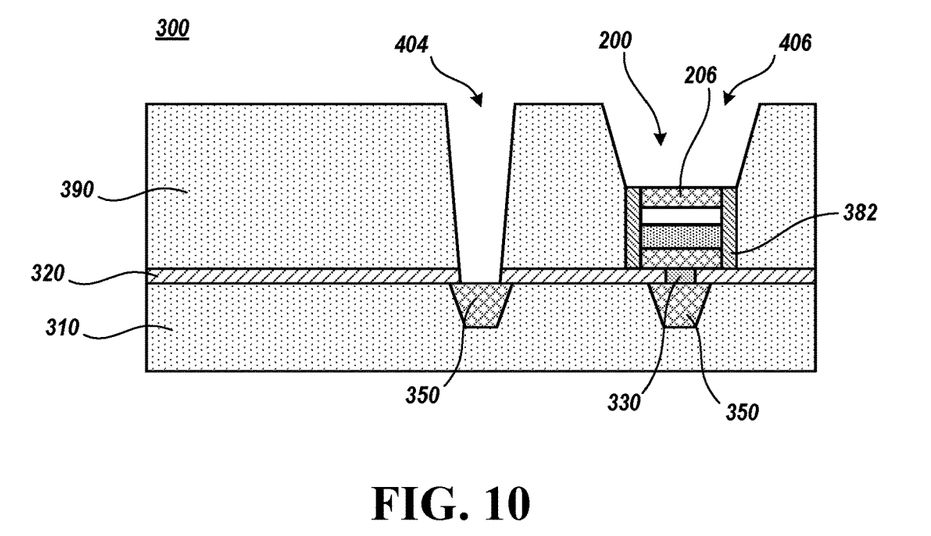

FIG. 10 depicts a cross-sectional fabrication view of semiconductor device 300, in accordance with embodiments of the present disclosure. At the present stage of fabrication, wiring trench 404 and wiring trench 406 are formed within ILD 390.

Wiring trench(es) 406, 404 may be formed by known selective removal techniques to remove undesired portions of ILD 390, generally above bottom wire 350 and/or generally above RRAM cell 200.

Wiring trench(es) 404 generally exposes at least a portion of an underlying conductive structure, respectively, such as respective bottom wires 350. Wiring trench(es) 406 generally exposes at least a portion of the upper surface of RRAM cell 200 (e.g., at least a portion of the upper surface of top electrode 206) and planarizes the upper surface of encapsulation spacers 382 with the upper surface of RRAM cell 200.

In a preferred implementation, as depicted, wiring trench 406 exposes the entire upper surface of the RRAM cell 200 (e.g., the upper surface of encapsulation spacers 382 and the upper surface of top electrode 206). Similarly, wire trench 404 exposes at least a portion of the upper surface of an associated bottom wire 350.

Etching techniques may be utilized to form wiring trenches 404, 406 with orthogonal type sidewall(s) (i.e., parallel to the sidewalls of the RRAM cell 200) or to form wiring trenches 404, 406 with sloped type sidewalls(s), as depicted.

In accordance with embodiments of the present disclosure, the upper surface of top electrode 206 may be utilized as an etch stop layer in which the etch, which forms wiring trench 406, stops. In this manner, wiring trench 406 is formed utilizing an etch stop that is embedded or otherwise included in the RRAM cell 200.

The etch technique utilized to form wiring trench 406 may be a physical or dry etch technique, or a chemical wet etch. In a preferred implementation, the etch technique to form wiring trench 406 is a chemical wet etch, and top electrode 206 is configured as a wet etchant stop.

FIG. 11 depicts a cross-sectional fabrication view of semiconductor device 300, in accordance with embodiments of the present disclosure. At the present stage of fabrication, wire 408 is formed within wiring trench 404, and top wire 410 is formed within wiring trench 406.

Wire 408 and top wire 410 may be formed by depositing an electrically conductive material within wiring trench(es) 404, and 406, respectively.

Top wire 410 may directly connect with the top electrode 206, the RRAM cell 200. For example, there may be no, or minimized, the electrical impedance between the top wire 410 and top electrode 206. For example, top wire 410 may contact a portion or the entire upper surface of top electrode 206. In some implementations, top wire 410 contacts the entire upper surface of top electrode 206 and further contacts at least a portion(s) of the upper surface(es) of the neighboring encapsulation spacer(s) 382, respectively.

Top wires 410 and 408 may be electrically connected to other components of the IC device by one or more electrical pathways within the IC device. For example, one or more electrical pathways may connect top wire 410 with the memory controller or the like. In this manner, components of the semiconductor device 300 may be electrically connected to RRAM cell 200.

FIG. 12 depicts a cross-sectional view of RRAM cell 200 that includes a resistance spreading layer 212 located between top electrode 206 and bottom electrode 210, in accordance with embodiments of the present disclosure. The RRAM cell 200 of FIG. 12 differs from that of FIG. 2 in that the relative orientation of the dual RRAM (i.e., the resistance spreading layer 212 and the filament-forming layer 202) is reversed. The direction of electrical current through the RRAM cell 200 of FIG. 12 (e.g., from the bottom electrode 210 to top electrode 206) may further be reversed than that of FIG. 2 (e.g., from top electrode 206 to bottom electrode 210). The description of RRAM cell 200 of FIG. 12 is like that of RRAM cell 200 of FIG. 2 and is not repeated herein.

Figure 13:
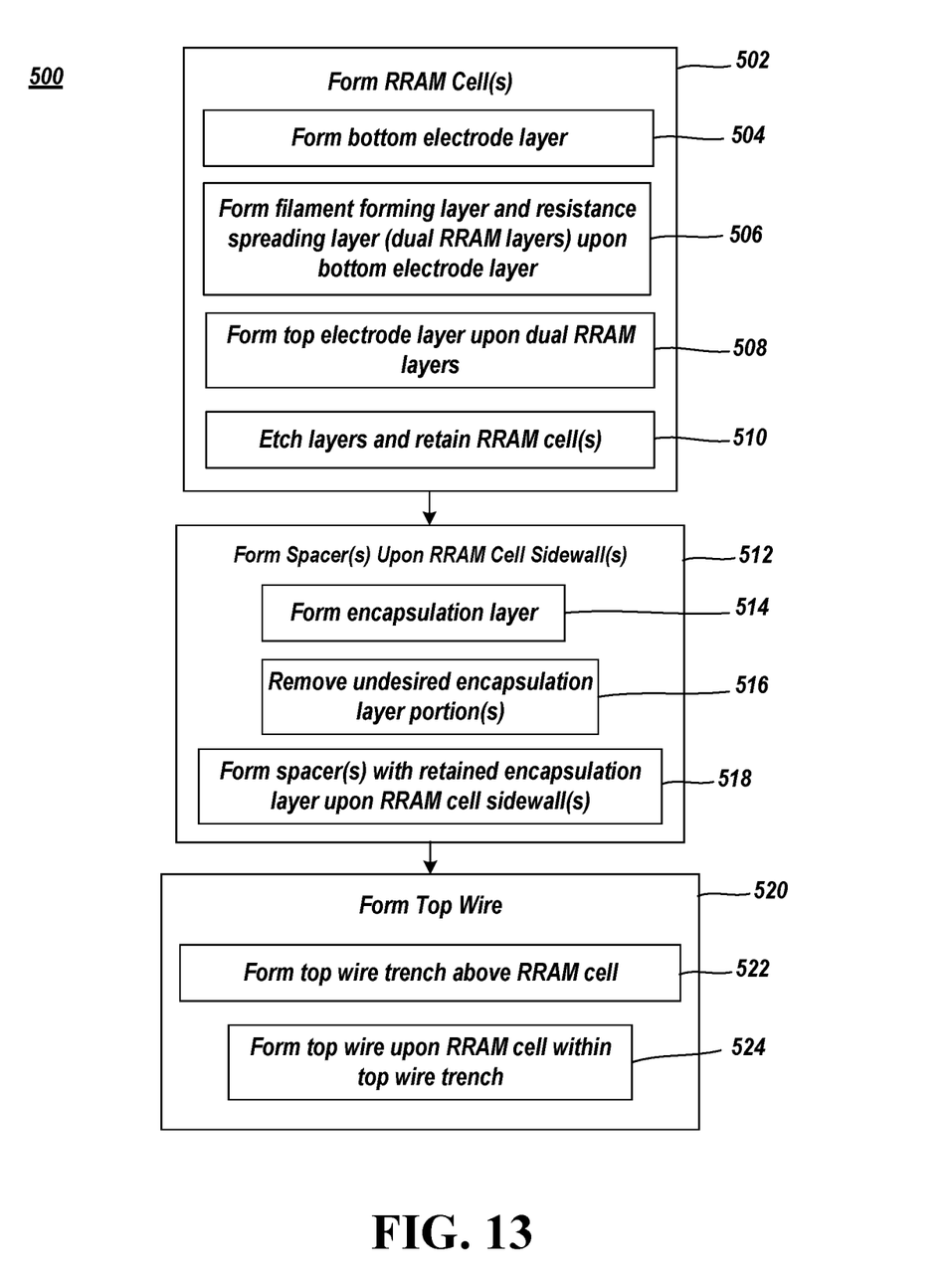
FIG. 13 depicts a method of fabricating a semiconductor device that includes an RRAM cell with the resistance spreading layer, in accordance with embodiments of the present disclosure.

FIG. 13 depicts method 500 of fabricating semiconductor device 300 that includes RRAM cell 200, in accordance with embodiments of the present disclosure. Method 500 may include forming one or more RRAM cells 200 (block 502). The RRAM cell 200 may be formed over a encapsulation layer 320 and/or over a bottom electrode 330 that is located within encapsulation layer 320. The RRAM cell 200 may be formed vertically in-line with the bottom electrode 330. For example, an associated in-line RRAM cell 200 and bottom electrode 330 may share the same vertical bisector.

Forming RRAM cell 200 may include forming a bottom electrode material layer 360 upon the encapsulation layer 320 over the bottom electrode 330 (block 504). Forming RRAM cell 200 may include forming resistance spreading layer 362 and filament-forming layer 364 upon bottom electrode material layer 360 (block 506). The relative orientation of the resistance spreading layer 362 and filament-forming layer 364 may be chosen as desired. Forming RRAM cell 200 may further include forming top electrode material layer 366 upon the filament-forming layer 364 (block 508). In some implementations, capping layer 368 may also be formed upon the top electrode material layer 366. Forming RRAM cell 200 may further include removing portion(s) while retaining other portion(s) of the bottom electrode material layer 360, resistance spreading layer 362, filament-forming layer 364, and top electrode material layer 366 to form one or more RRAM cells 200 (block 510).

Method 500 may further include forming encapsulation spacer(s) 382 upon the RRAM cell 200 sidewall(s) (block 512). The encapsulation spacer(s) 382 may be formed by forming an encapsulation layer upon the substrate encapsulation layer 320 and upon and around the RRAM cell 200 (block 514).

The encapsulation spacer(s) 382 may be further formed by removing undesired portion(s) of the encapsulation layer (block 516). For example, undesired encapsulation layer portion(s) is etched away by a chemical or physical etch. The desired or retained encapsulation layer portion(s) effectively forms the encapsulation spacer(s) 382 and may be located upon the sidewall(s) or side surface(s) of one or more RRAM cells 200 (block 518).

Method 500 may continue with forming a top wire in the RRAM cell 200 and/or upon the encapsulation spacer(s) 382 (block 520). For example, a top wire 410 is formed within an ILD 390 that is located above the upper surface of the RRAM cell 200 and above the upper surface of encapsulation spacer(s) 382. A wiring trench 406 may be formed within the ILD 390 utilizing the upper surface top electrode 206 as an etch stop (block 522), thereby exposing the upper surface of the upper surface top electrode 206. The etch may further expose at least a portion of the upper surface of encapsulation spacer(s) 382. The top wire 410 may be formed by depositing a conductive material within the wiring trench 406 such that the conductive material contacts the upper surface of top electrode 206 (block 524). The conductive material may further contact the portion(s) of encapsulation spacer(s) 382. A CMP may be utilized to planarize the upper surface of the top wire 410 and the upper surface of ILD 390.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A resistive random-access memory (RRAM) cell comprising:
    a bottom electrode that is substantially horizontal below and in direct contact with a resistance spreading layer that is substantially horizontal and that is composed of an amorphous semiconductor material;
    a top electrode that is substantially horizontal above and in direct contact with a filament forming layer that is substantially horizontal, wherein current flow through the top electrode produces a filament within the filament forming layer that electrically connects the bottom of the top electrode with the top of the resistance spreading layer;
    wherein the resistance spreading layer radially propagates the current flow from the filament from top of the resistance spreading layer to the bottom of the resistance spreading layer into the bottom electrode and wherein respective sidewalls of the bottom electrode, the resistance spreading layer, the filament forming layer, and the top electrode are coplanar;
    a spacer directly upon respective and coplanar sidewalls of the bottom electrode, the resistance spreading layer, the filament forming layer, and the top electrode; and
    a top wire in direct contact with the top electrode and in direct contact with the spacer.

2. The RRAM cell of claim 1, wherein there is no impedance between an entire upper surface of the filament forming layer and an entire bottom surface of the top electrode.

3. The RRAM cell of claim 2, wherein there is no impedance between an entire bottom surface of the filament forming layer and an entire upper surface of the resistance spreading layer.

4. The RRAM cell of claim 3, wherein there is no impedance between an entire bottom surface of the resistance spreading layer and an entire upper surface of the bottom electrode.

5. The RRAM cell of claim 4, wherein respective sidewalls of the bottom electrode, the resistance spreading layer, the filament forming layer, and the top electrode are coplanar.

6. The RRAM cell of claim 1, wherein the resistance spreading layer is between the top electrode and the bottom electrode.

7. The RRAM cell of claim 1, wherein the top electrode is a titanium nitride (TiN) top electrode, wherein the bottom electrode is a TiN bottom electrode, wherein the filament forming layer is a transition metal oxide filament forming layer.

8. A resistive random-access memory (RRAM) cell comprising:
- a top electrode that is substantially horizontal above and in direct contact with a resistance spreading layer that is substantially horizontal and that is composed of an amorphous semiconductor material;
- a bottom electrode below that is substantially horizontal and in direct contact with a filament forming layer that is substantially horizontal, wherein current flow through the bottom electrode produces a filament within the filament forming layer that electrically connects the top of the bottom electrode with the bottom of the resistance spreading layer; and
- wherein the resistance spreading layer radially propagates the current flow from the filament from bottom of the resistance spreading layer to the top of the resistance spreading layer into the top electrode and wherein respective sidewalls of the bottom electrode, the resistance spreading layer, the filament forming layer, and the top electrode are coplanar;
- a spacer upon respective and coplanar sidewalls of the bottom electrode, the resistance spreading layer, the filament forming layer, and the top electrode;
- an encapsulation layer in direct contact with the spacer and in direct contact with the bottom electrode; and
- a bottom wire in direct contact with the encapsulation layer and in electrical contact with the bottom electrode.

9. The RRAM cell of claim 8, wherein there is no impedance between an entire bottom surface of the filament forming layer and an entire upper surface of the bottom electrode.

10. The RRAM cell of claim 9, wherein there is no impedance between an entire upper surface of the filament forming layer and an entire bottom surface of the resistance spreading layer.

11. The RRAM cell of claim 10, wherein there is no impedance between an entire upper surface of the resistance spreading layer and an entire bottom surface of the top electrode.

12. The RRAM cell of claim 11, wherein respective sidewalls of the bottom electrode, the resistance spreading layer, the filament forming layer, and the top electrode are coplanar.

13. The RRAM cell of claim 8, wherein the resistance spreading layer is between the top electrode and the bottom electrode.

14. The RRAM cell of claim 8, wherein the top electrode is a titanium nitride (TiN) top electrode, wherein the bottom electrode is a TiN bottom electrode, wherein the filament forming layer is a transition metal oxide filament forming layer.

15. A resistive random-access memory (RRAM) cell fabrication method comprising:
- forming a bottom electrode above and vertically in-line with a bottom wire;
- forming a filament forming layer directly upon the bottom electrode;
- forming a resistance spreading layer composed of an amorphous semiconductor material directly upon the filament forming layer;
- forming a top electrode directly upon the filament forming layer;
- forming a sacrificial cap directly upon the top electrode;
- forming a spacer upon respective and coplanar sidewalls of the bottom electrode, the resistance spreading layer, the filament forming layer, the top electrode, and the sacrificial cap;
- forming an interlayer dielectric (ILD) directly upon the spacer and directly upon the sacrificial cap;
- etching a top wire trench within the ILD, the etch removing the sacrificial cap and exposing the top electrode; and
- forming a top wire within the top wire trench directly upon the exposed top electrode and directly upon the spacer.

* * * * *